US012605771B2

(12) United States Patent
Zettler et al.

(10) Patent No.: US 12,605,771 B2
(45) Date of Patent: Apr. 21, 2026

(54) MODULAR CUTTING TOOL HAVING INTEGRAL CENTRAL PIN AND TORQUE TRANSFER MECHANISM

(71) Applicant: ISCAR, LTD., Tefen (IL)

(72) Inventors: Martin Ulrich Zettler, Vaihingen-Horrheim (DE); Nikolaos Poussios, Vaihingen-Horrheim (DE); Henner Michael Dziubas, Vaihingen-Horrheim (DE); Tolga Kizilirmak, Vaihingen-Horrheim (DE)

(73) Assignee: ISCAR, LTD., Tefen (IL)

( * ) Notice: Subject to any disclaimer, the term of this patent is extended or adjusted under 35 U.S.C. 154(b) by 592 days.

(21) Appl. No.: 18/166,923

(22) Filed: Feb. 9, 2023

(65) Prior Publication Data

US 2024/0269752 A1 Aug. 15, 2024

(51) Int. Cl.
B23B 27/16 (2006.01)
(52) U.S. Cl.
CPC .................................... B23B 27/16 (2013.01)
(58) Field of Classification Search
CPC ....... B23C 5/10; B23C 5/109; B23C 2210/02; B23C 2210/03; B23C 2210/24; B23C 2210/121
See application file for complete search history.

(56) References Cited

U.S. PATENT DOCUMENTS

| | | | | | |
|---|---|---|---|---|---|
| 2,219,907 | A | * | 10/1940 | Ross | F16D 1/112 |
| | | | | | 279/93 |
| 4,834,597 | A | * | 5/1989 | Andersson | B23B 31/1107 |
| | | | | | 409/234 |
| 5,800,098 | A | * | 9/1998 | Satran | B23B 31/008 |
| | | | | | 407/31 |
| 6,623,202 | B2 | * | 9/2003 | Hansson | B23B 31/008 |
| | | | | | 464/182 |
| 7,121,771 | B2 | * | 10/2006 | Englund | B23B 27/1622 |
| | | | | | 407/111 |

(Continued)

FOREIGN PATENT DOCUMENTS

| | | | | |
|---|---|---|---|---|
| CN | 203843261 U | 9/2014 | | |
| DE | 102014211417 B3 | * | 11/2015 | B23B 31/0261 |

(Continued)

*Primary Examiner* — Nicole N Ramos
(74) *Attorney, Agent, or Firm* — Womble Bond Dickinson (US) LLP

(57) ABSTRACT

A tool body having a longitudinal body axis has a central body recess recessed in a rear body surface thereof. The recess includes an inner recess surface, and a body recess peripheral surface extending between the inner recess surface and the rear body surface. An integral central pin extends rearwardly from the inner recess surface, and having an integral pin length measured along the longitudinal body axis from the inner recess surface to a rear pin surface thereof. In a circumferential direction about the longitudinal body axis, the body recess peripheral surface alternatingly increases and decreases in distance from the longitudinal body axis, thereby forming a plurality of angularly spaced apart longitudinal axis crests. A tool holder has a protrusion with complementary surfaces to engage the tool body. A fastening member, such as a lock nut, secures the tool body to the tool holder to form a cutting tool.

16 Claims, 6 Drawing Sheets

(56)                    References Cited

U.S. PATENT DOCUMENTS

| | | | |
|---|---|---|---|
| 8,967,928 B2 * | 3/2015 | Kress | B23B 29/03428 |
| | | | 408/239 R |
| 9,669,478 B2 * | 6/2017 | Burtscher | B23C 5/10 |
| 10,751,814 B2 * | 8/2020 | Kemmler | B23C 5/10 |
| 2002/0002886 A1 * | 1/2002 | Hansson | B23B 31/008 |
| | | | 82/161 |
| 2002/0003985 A1 | 1/2002 | Hansson et al. | |
| 2012/0039676 A1 * | 2/2012 | Marshansky | B23C 5/1072 |
| | | | 407/56 |

FOREIGN PATENT DOCUMENTS

| | | | | |
|---|---|---|---|---|
| EP | 1413374 A1 * | 4/2004 | | B23B 31/008 |
| EP | 1990113 A1 * | 11/2008 | | B23B 51/00 |
| EP | 3495080 A1 * | 6/2019 | | B23B 51/12 |
| FR | 2321069 A1 * | 3/1977 | | |
| WO | WO-9419132 A1 * | 9/1994 | | B23Q 16/08 |

* cited by examiner

MODULAR CUTTING TOOL HAVING INTEGRAL CENTRAL PIN AND TORQUE TRANSFER MECHANISM

FIELD OF THE INVENTION

The subject matter of the present application relates to cutting tools having torque transfer mechanisms.

BACKGROUND OF THE INVENTION

In the field of metal cutting, it is known to provide a cutting tool, including a tool body and a tool holder, with a torque transfer mechanism. Further, it may be advantageous to allow the tool body to fasten to the tool holder in multiple positions.

A cutting tool, including a tool body, a tool holder and a fastening member, is disclosed having two possible positions for the fastening the tool body to the tool holder in EP3495080.

Cutting tools including a torque transfer mechanism with a plurality of teeth, and a recess accommodating such teeth, can be seen in WO0187525 and CN203843261.

It is an object of the subject matter of the present application to provide an elongated cutting tool with a compact torque transfer mechanism.

SUMMARY OF THE INVENTION

In accordance with a first aspect of the invention there is provided an elongated tool body having a longitudinal body axis defining opposite forward and rearward body directions, the tool body comprising: a body peripheral surface extending about the longitudinal body axis; a rearwardly disposed rear body surface circumferentially bounded by the body peripheral surface; a central body recess recessed in the rear body surface, and comprising: an inner recess surface located forwardly of the rear body surface; a body recess peripheral surface extending between the inner recess surface and the rear body surface; and a recess depth measured along the longitudinal body axis from the rear body surface to the inner recess surface; and an integral central pin forming a one-piece construction with the rear body surface and the central body recess, the integral central pin comprising: a rear pin surface located rearwardly of the inner recess surface and delimiting the integral central pin in the rearward body direction; a peripheral pin surface located between the inner recess surface and the rear pin surface; and an integral pin length measured along the longitudinal body axis from the inner recess surface to the rear pin surface; wherein: in a circumferential direction about the longitudinal body axis, the body recess peripheral surface alternatingly increases and decreases in distance from the longitudinal body axis, thereby forming a plurality of angularly spaced apart longitudinal axis crests; and a minimal recess width is measured as the minimal distance between the peripheral pin surface and the plurality of longitudinal axis crests.

In accordance with a second aspect of the invention, there is provided a tool holder having a longitudinal holder axis defining opposite forward and rearward holder directions, the tool holder comprising: a peripheral holder surface extending about the longitudinal holder axis; a fastening mechanism located about the longitudinal holder axis on the peripheral holder surface; a forwardly disposed forward holder surface facing in the forward direction; and a central holder protrusion protruding forwardly from the forward holder surface, the central holder protrusion comprising: a forward protrusion surface, axially spaced apart from, and located forwardly of, the forward holder surface; a protrusion peripheral surface extending about the longitudinal holder axis, between the forward protrusion surface and the forward holder surface; and a central protrusion recess recessed in the forward protrusion surface; wherein: in a circumferential direction about the longitudinal holder axis, the protrusion peripheral surface alternatingly increases and decreases in distance from the longitudinal holder axis, thereby forming a plurality of angularly spaced apart holder teeth.

A cutting tool may comprise: a tool body of the type described above; a tool holder having a longitudinal holder axis defining opposite forward and rearward holder directions; and a fastening member fastening the tool body to the tool holder.

It is understood that the above-said is a summary, and that features described hereinafter may be applicable in any combination to the subject matter of the present application, for example, any of the following features may be applicable to the tool body or the tool holder or the cutting tool.

The integral central pin 50 may be cylindrical with a pin diameter Dp; and a ratio of the integral pin length Pi to the pin diameter Dp may fulfill the condition $1 \leq Pi/Dp \leq 8$.

A ratio of the integral pin length Pi to the minimal recess width W may fulfill the following condition: $3 \leq Pi/W \leq 20$.

A ratio of the recess depth Rd to the minimal recess width W may fulfill the following condition: $3 \leq Rd/W \leq 5$.

The rear body surface, the central body recess and the integral central pin may comprise an additively manufactured monolithic structure.

The longitudinal axis crests may be evenly spaced apart about the longitudinal body axis.

The tool body may further comprise a locating pin receptacle recessed therein.

The body peripheral surface may comprise a clamping flange surface sloping away from the longitudinal body axis in the rearward body direction.

The recess depth Rd may fulfil the following condition: $3 \text{ mm} \leq Rd \leq 10 \text{ mm}$.

The minimal recess width W may fulfil the following condition: $1 \text{ mm} \leq W \leq 2.5 \text{ mm}$.

At least one body coolant outlet may be in fluid connection with, and located forwardly of, at least one body coolant inlet.

The body coolant inlet may be located on the integral central pin; and at least one body coolant channel may connect the body coolant inlet to the body coolant outlet.

A holder protrusion minimal thickness T, measured from the central body recess to the protrusion peripheral surface, may fulfil the following condition: $0.9 \text{ mm} \leq T \leq 2.5 \text{ mm}$.

The tool holder may further comprise a locating pin protruding from the forward holder surface.

At least two pin fastening bores may be recessed in the forward holder surface; and the locating pin may be detachably fastened to one of the pin fastening bores.

The tool holder may have a peripheral holder surface comprising a male thread; and the fastening member may comprise a lock nut having a female thread engaged to the male thread of the peripheral holder surface.

The tool holder may comprise: a peripheral holder surface extending about the longitudinal holder axis; a fastening mechanism located about the longitudinal holder axis on the peripheral holder surface; a forwardly disposed forward holder surface facing in the forward direction; and a central holder protrusion protruding forwardly from the forward holder surface, the central holder protrusion comprising: a forward protrusion surface, axially spaced apart from, and located forwardly of, the forward holder surface; a protrusion peripheral surface extending about the longitudinal holder axis, between the forward protrusion surface and the forward holder surface; and a central protrusion recess recessed in the forward protrusion surface; wherein: in a circumferential direction about the longitudinal holder axis, the protrusion peripheral surface alternatingly increases and decreases in distance from the longitudinal holder axis, thereby forming a plurality of angularly spaced apart holder teeth.

The central holder protrusion of the tool holder may be accommodated in the central body recess of the tool body; the plurality of holder teeth may abut against the body recess peripheral surface; the inner recess surface may be spaced apart from the forward protrusion surface; and the integral central pin may be accommodated within, and spaced apart from, the central protrusion recess.

The tool body may further comprise a locating pin receptacle recessed therein; the tool holder may further comprise a locating pin protruding therefrom; and the locating pin may be accommodated within, and spaced apart from, the locating pin receptacle.

BRIEF DESCRIPTION OF THE FIGURES

For a better understanding of the present application and to show how the same may be carried out in practice, reference will now be made to the accompanying drawings, in which.

Figure 1:
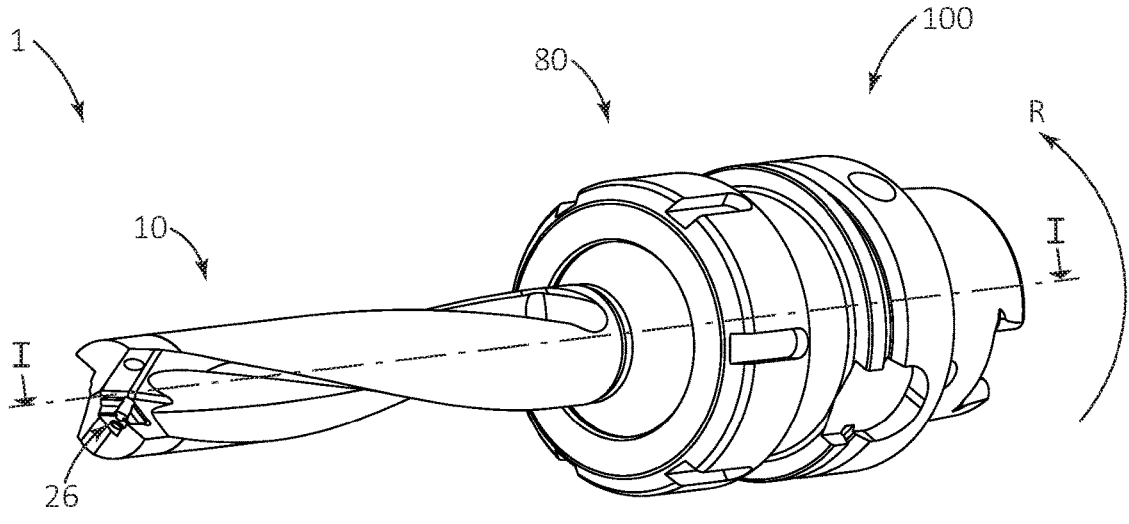
FIG. 1 is a perspective view of a cutting tool in accordance with an embodiment of the present invention.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Figure 2:
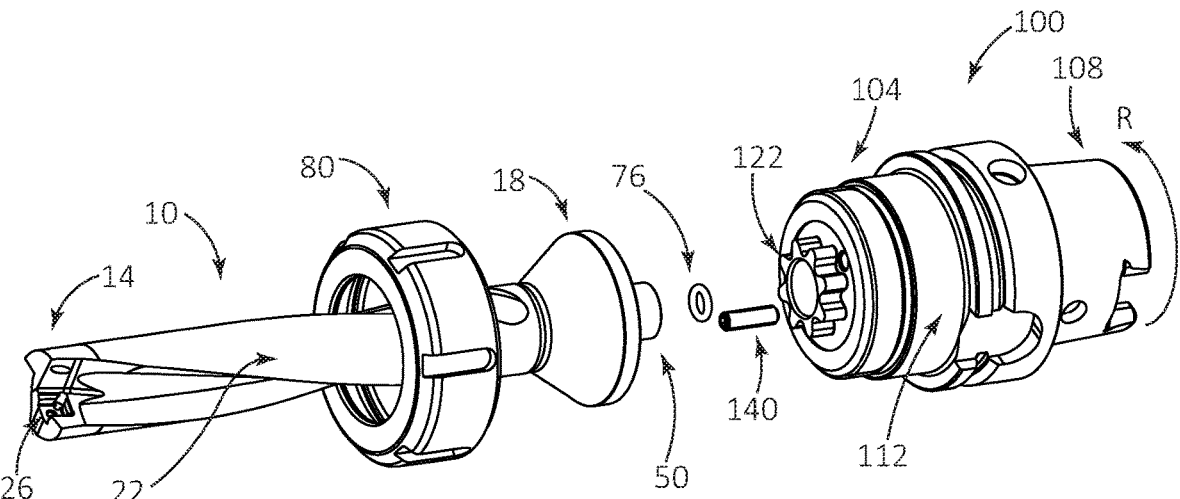
FIG. 2 is an exploded perspective view of the cutting tool of FIG. 1.
Figure 3:
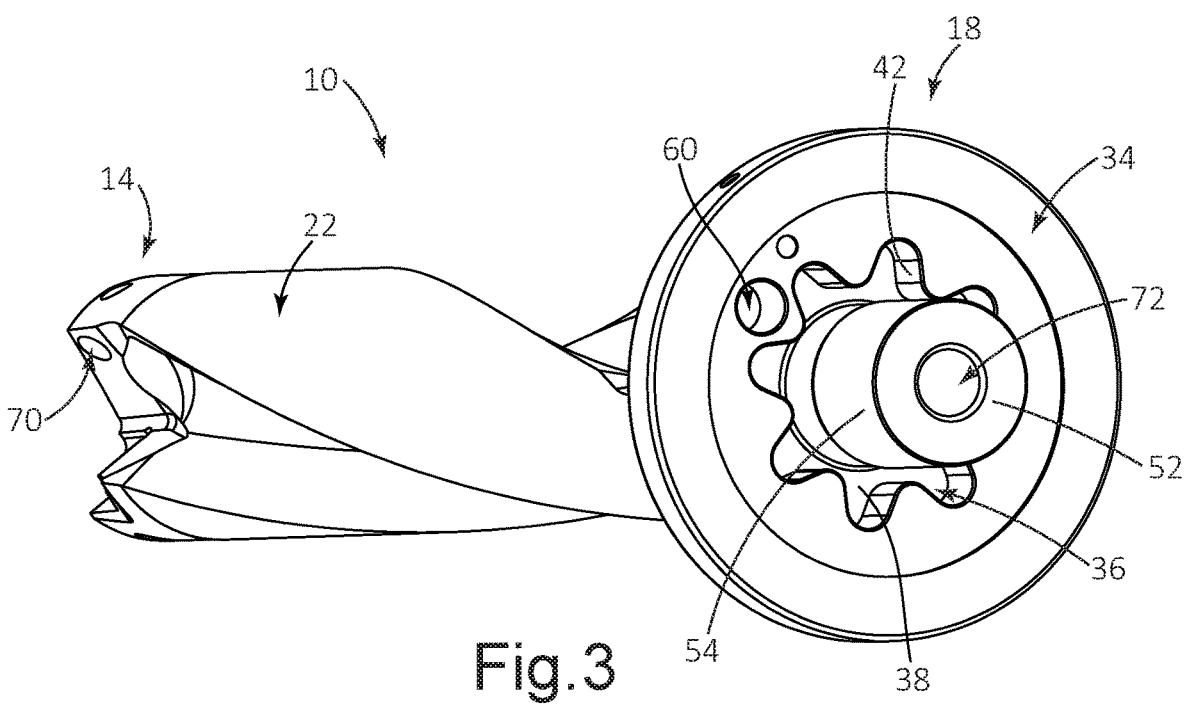
FIG. 3 is a perspective view of a tool body shown in FIG. 1.
Figure 4:
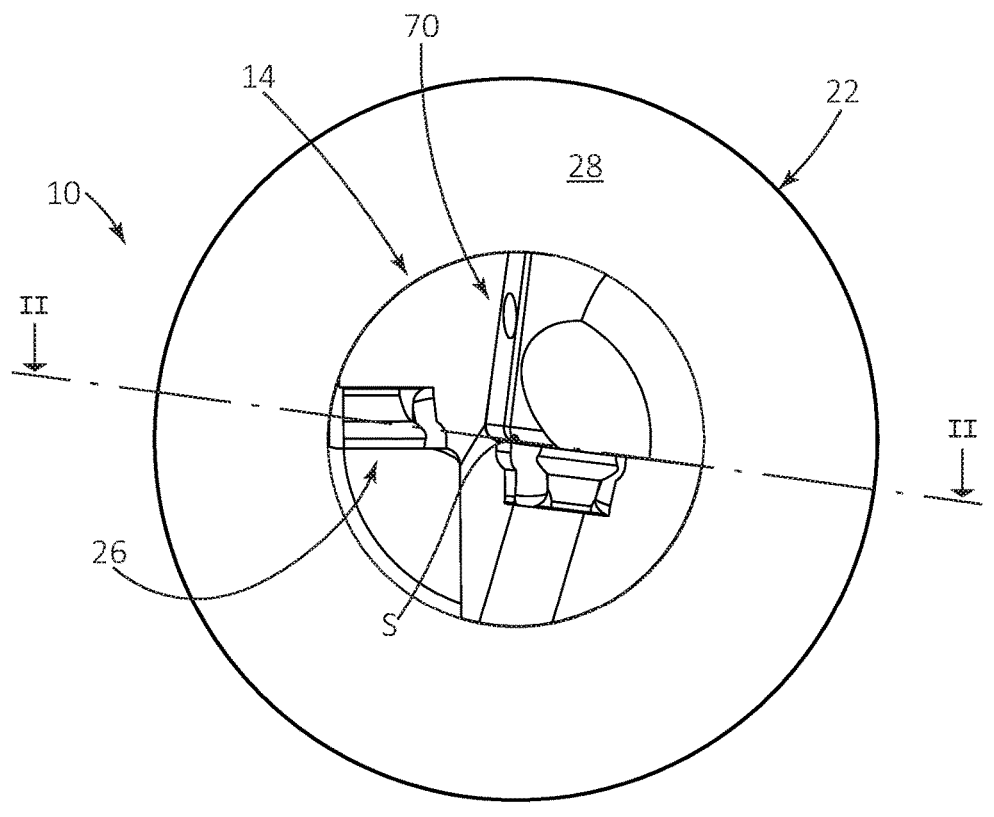
FIG. 4 is a front view of the tool body of FIG. 3.

Attention is first drawn to FIGS. 1 to 2, a cutting tool 1, an elongated tool body 10, a fastening member 80 and a tool holder 100 (also called a "shank") is shown. The fastening member 80 may be, for example, a lock nut. The tool body 10 has a longitudinal body axis S defining opposite forward and rearward body directions Bf, Br. In some embodiments, the cutting tool 1 may be a rotary cutter, such as a milling or drilling tool. In such case the cutting tool 1 would have a direction of rotation R about a rotational axis of the tool and the longitudinal body axis S may overlap with the cutting tool's rotational axis.

As shown in FIGS. 3 to 7, The tool body 10 includes a body forward end portion 14, a body rearward end portion 18 and a body peripheral surface 22 extending about the longitudinal body axis S. The tool body 10 is delimited in the forward and rearward body directions Bf, Br, respectively, by the body forward end portion 14 and the body rearward end portion 18.

In some embodiments, at least one insert seat 26 may be located at the body forward end portion 14. Alternatively, such a cutting tool may be made as a one-piece cutter.

The tool body 10 further includes a rearwardly disposed rear body surface 34, a central body recess 36 and an integral central pin 50. The rear body surface 34 is circumferentially bounded by the body peripheral surface 22 and faces in the rearward body direction Br. The central body recess 36 is recessed in the rear body surface 34. In some embodiments, the rear body surface 34 is perpendicular to the longitudinal body axis S.

The integral central pin 50 forms a one-piece construction (i.e., "monolithic construction") with the rear body surface 34 and the central body recess 36. Having monolithic construction for the rear body surface 34, the central body recess 36 and the integral central pin 50 on the tool body 10 allows for no post-manufacture assembly and makes the tool body 10 easier to manufacture. Preferably but optionally, the tool body 10 is additively manufactured and has an integral one-piece construction ("monolithic construction"). As is known to those skilled in the art, an additively manufactured monolithic structure is distinguishable by its layers and microstructure from one that is made by casting following by milling or other cutting operations.

The integral central pin 50 is devoid of threading for fastening thereon. The central body recess 36 is shaped in a way disallowing rotational movement between the tool body 10 and the tool holder 100 when the cutting tool 1 is assembled, meaning such threading cannot be used for fastening.

Preferably but optionally, the body peripheral surface 22 may have a forwardly tapered clamping flange surface 28, facilitating the fastening between the tool body 10 and the tool holder 100. The clamping flange surface 28 slopes away from the longitudinal body axis S in the rearward body direction Br, and thus is forwardly tapered. The clamping flange surface 28 may be located adjacent to the rear body surface 34 along the longitudinal body axis S.

The central body recess 36 has an inner recess surface 38 and a body recess peripheral surface 42. The inner recess surface 38 is located forwardly of the rear body surface 34 and faces in the rearward body direction Br. The body recess peripheral surface 42 extends between the inner recess surface 38 and the rear body surface 34. The integral central pin 50 extends rearwardly from the inner recess surface 38 and is delimited in the rearward body direction Br by a rear pin surface 52. A peripheral pin surface 54 is located between the rear pin surface 52 and the inner recess surface 38. Preferably but optionally, the central body recess 36 and the integral central pin 50 are centered about the longitudinal body axis S. This facilitates fastening the tool body 10 to the tool holder 100 in different positions.

An integral pin length Pi is measured along the longitudinal body axis S from the inner recess surface 38 to the rear pin surface 52. In some embodiment, the integral central pin 50 protrudes farther than the rear body surface 34 in the rearward body direction Br. This will make it easier to fasten the tool body 10 to the tool holder 100.

In some embodiments, the body recess peripheral surface 42 extends parallel to the longitudinal body axis S. Alternatively worded, any line parallel to the longitudinal body axis S that intersects the body recess peripheral surface 42 also coincides with the body recess peripheral surface 42.

In a circumferential direction about the longitudinal body axis S, the body recess peripheral surface 42 alternatingly increases and decreases in distance from, and about, the longitudinal body axis S. Such decreases and increases in distance form a plurality of longitudinal axis crests 46, angularly spaced apart about the longitudinal body axis S. The plurality of longitudinal axis crests 46 are spaced apart from one another by a plurality of angularly spaced apart longitudinal axis troughs 48, formed by the increases in distance of the body recess peripheral surface 42 from the longitudinal body axis S. In embodiments where the cutting tool rotates about an axis, portions of the body recess peripheral surface 42 which face opposite to the direction of rotation R serve as 'driven surfaces'. These 'driven surfaces' are abutted by 'driving surfaces' formed on the teeth 132 (described below), when the tool body 10 is mounted on the tool holder 100 in the assembled tool 1.

Such a configuration allows for a compact torque transfer mechanism (i.e., the central body recess 36 and the integral central pin 50, along with a central holder protrusion 122 as described below). That is to say, the torque transfer mechanism can be located away from the body peripheral surface 22 and close to the longitudinal body axis S. In some embodiments, the body peripheral surface 22 intersects the rear body surface 34, with any further component recessed in, or extending out from, the rear body surface 34 being spaced apart from the body peripheral surface 22. A maximum diameter Dm of the central body recess 36 can thus be made smaller. Having a compact torque transfer mechanism may allow, for instance, for tool bodies having smaller diameter tool bodies to fit to the tool holder than a non-compact torque transfer mechanism, which requires a larger diameter in order for the tool body to envelope the torque transfer mechanism.

Preferably but optionally, the longitudinal axis crests 46 are evenly spaced apart about the longitudinal body axis S. In such case, the tool body 10 can be attached to the tool holder 100 in multiple positions.

In some embodiments, where the tool body 10 can be attached to the tool holder 100 in multiple positions, it may be advantageous to limit the number of positions the tool body 10 can be attached to the tool holder 100. To do that, the tool body 10 may include a locating pin receptacle 60. The locating pin receptacle 60 may be recessed in the rear body surface 34.

Figure 5:
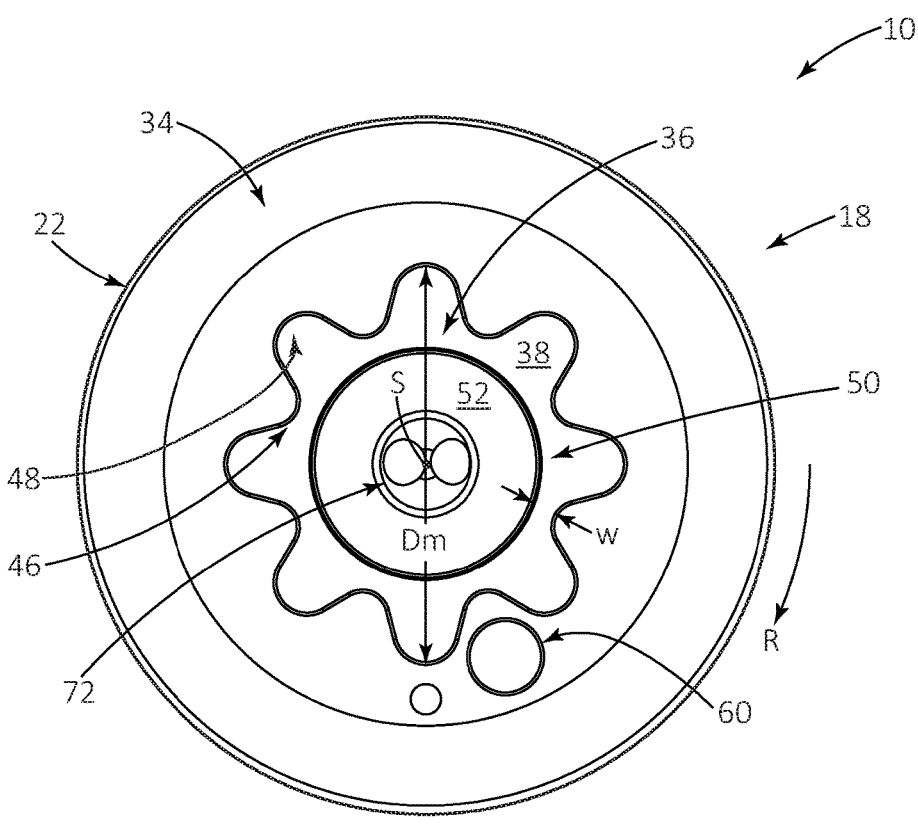
FIG. 5 is a rear view of the tool body of FIG. 3.
Figure 6:
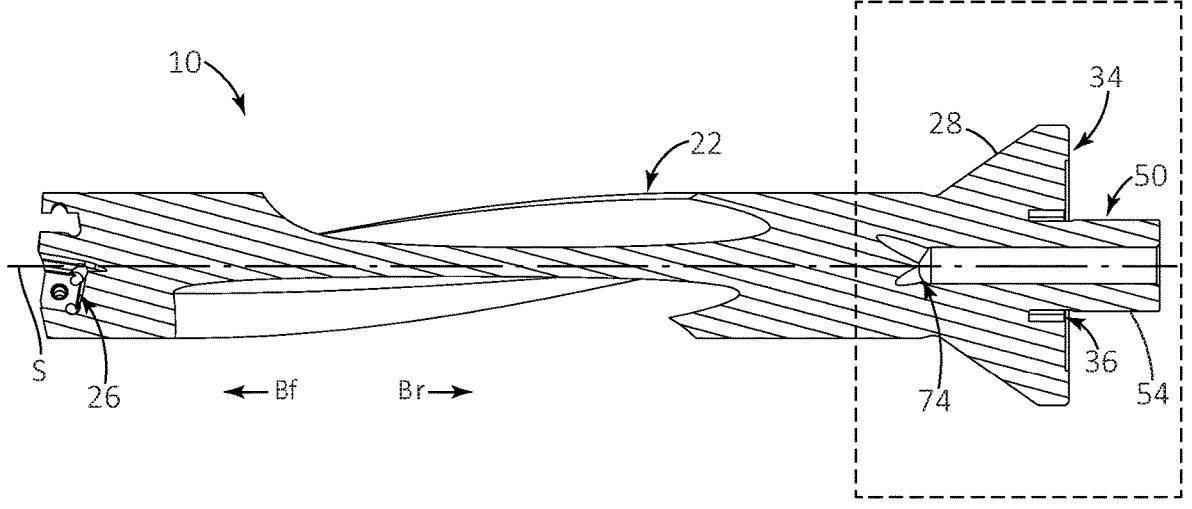
FIG. 6 is a cross section view of the tool body of FIG. 3 along line II-II in FIG. 4.
Figure 7:
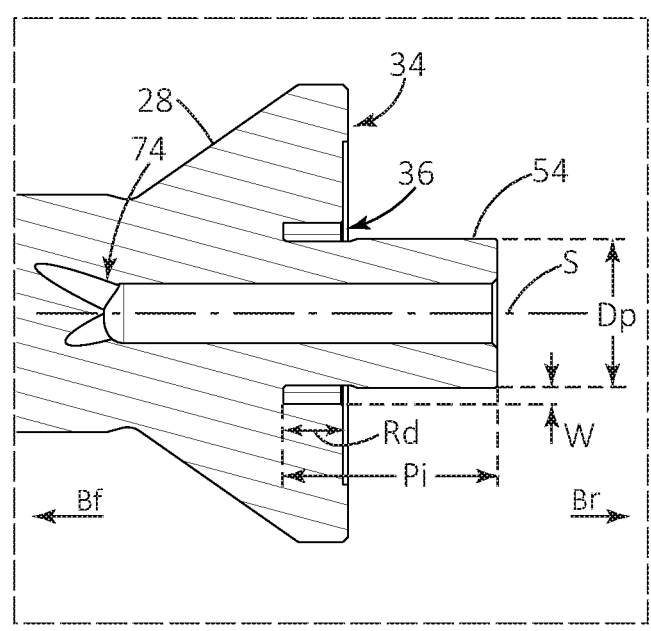
FIG. 7 is a close-up view of the dotted portion in FIG. 6.
Figure 8:
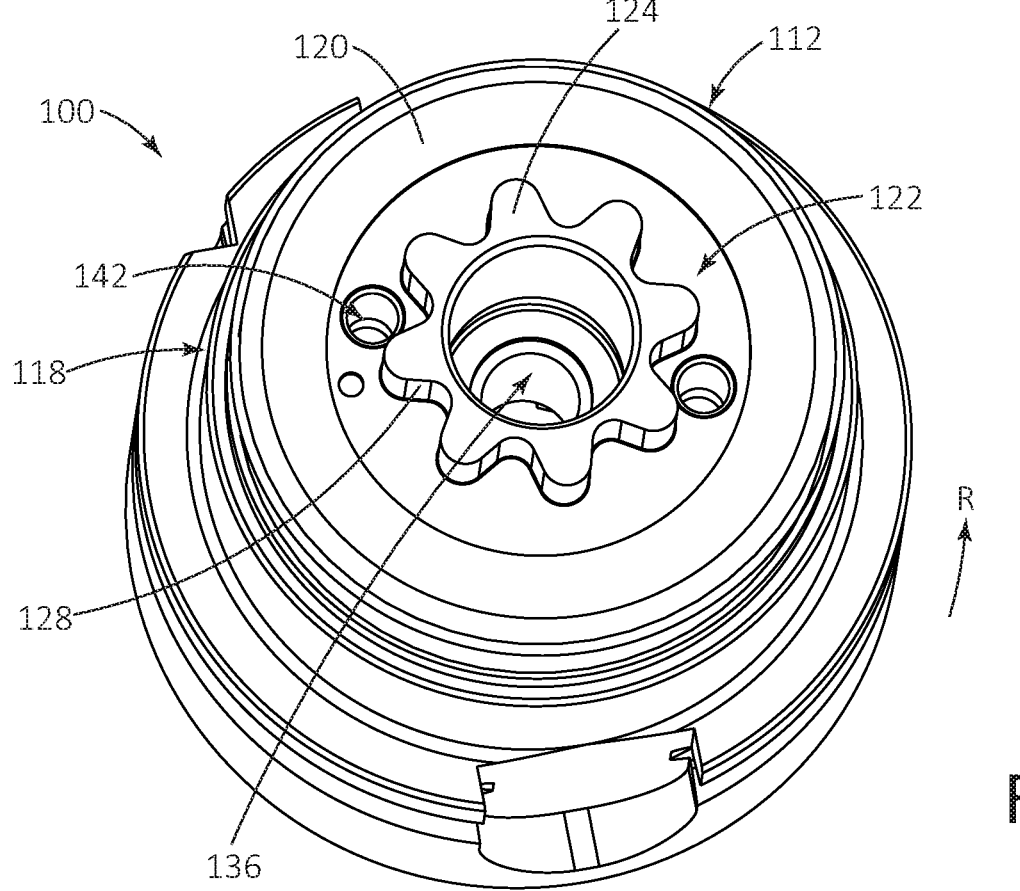
FIG. 8 is a perspective view of a tool holder shown in FIG. 1.

Drawing attention to FIGS. 5 to 7, a recess depth Rd and a minimal recess width W are defined. The recess depth Rd is measured along the longitudinal body axis S from the rear body surface 34 to the inner recess surface 38. In some embodiments, the recess depth Rd fulfils the following condition: 3 mm≤Rd≤10 mm. Making the recess depth Rd too shallow would limit the torque transfer between the tool body 10 and the tool holder 100, while having the length of the recess depth Rd too large will lead to a longer integral central pin 50 and may also lead to issues such as deformation of the torque transfer mechanism during machining operations.

The minimal recess width W is measured as the minimal distance between the integral central pin 50 and the plurality of longitudinal axis crests 46. For example, in embodiments where the body recess peripheral surface 42 extends parallel to the longitudinal body axis S, the minimal recess width W will be measured perpendicular to the longitudinal body axis S, from the integral central pin 50 to the body recess peripheral surface 42. Specifically, the minimal recess width W is measured from the peripheral pin surface 54 to the longitudinal axis crest 46. In some embodiments, the minimal recess width W fulfils the following condition: 1 mm≤W≤2.5 mm. The smaller the minimal recess width W, the more compact the torque transfer mechanism can be. At the same time, making the minimal recess width W too small may lead to issues in the torque transfer mechanism, as described above.

In some embodiments, the ratio Rd/W of the recess depth Rd to the minimal recess width W fulfills the following condition: 3.5≤Rd/W≤5. More preferably, the ratio Rd/W fulfills the condition: 4≤Rd/W≤4.5. Most preferably, the ratio Rd/W=4⅓.

The greater the ratio Rd/W between the recess depth Rd and the minimal recess width W, the more compact the torque transfer mechanism can be made. However, having the recess depth Rd have too great a length, relative to the minimal recess width W, may cause issues in the rigidity and robustness of the torque transfer mechanism.

In some embodiments, the ratio Pi/W of the integral pin length Pi to the minimal recess width W fulfills the following condition: 3≤Pi/W≤20. More preferably, the ratio Pi/W fulfills the condition: 4≤Pi/W≤18.

The integral central pin 50 may be cylindrical with a pin diameter Dp. The ratio Pi/Dp of the integral pin length Pi to the pin diameter Dp fulfills the condition 1≤Pi/Dp≤8. More preferably, the ratio Pi/Dp fulfills the condition 2≤Pi/Dp≤4. Making this ratio too large may result in a weak pin which is susceptible to issues such as deformation, while making it too small may make coupling of the tool body and the tool holder harder.

Using traditional reductive manufacturing (i.e., metal machining), as opposed to additive manufacturing, creates constraints on the ratio and scale of the tool body 10. Due to the integral central pin 50 being integral to the tool body 10, creating a central body recess 36 using traditional manufacturing may require special cutting tools, limits the possible geometry of the central body recess 36 and the integral central pin 50. Thus, using additive manufacturing allows for a more compact torque transfer in the tool body 10.

In some embodiments, the tool body 10 has at least one body coolant outlet 70 and at least one body coolant inlet 72. The body coolant outlet 70 is located forwardly of, and is in fluid connection with (i.e., fluid communication), the body coolant inlet 72. For example, at least one body coolant channel 74 may connect the body coolant inlet 72 to the body coolant outlet 70. An O-ring 76 may be added for a better fluid connection.

The body coolant inlet 72 is located in the body rearward end portion 18. The body coolant inlet 72 may be located on the integral central pin 50. Specifically, the body coolant inlet 72 may be located on the integral central pin 50. More specifically, the body coolant inlet 72 may be located on the rear pin surface 52. The body coolant inlet 72 may further be centered about the longitudinal body axis S.

Drawing attention to FIGS. 8 to 11, the tool holder 100 has a longitudinal holder axis L defining opposite forward and rearward holder directions Hf, Hr, a forward holder end portion 104 and a rearward holder end portion 108. The tool holder 100 is delimited in the forward and rearward holder directions Hf, Hr, respectively, by the forward holder end portion 104 and the rearward holder end portion 108.

The tool holder 100 includes a peripheral holder surface 112, a fastening mechanism 116, a forwardly disposed forward holder surface 120 and a central holder protrusion 122.

The peripheral holder surface 112 extends about the longitudinal holder axis L. The fastening mechanism 116 is located about the longitudinal holder axis L on the peripheral holder surface 112. The forward holder surface 120 is circumferentially bounded by the peripheral holder surface 112 and the central holder protrusion 122 protrudes forwardly from the forward holder surface 120.

In some embodiments, the fastening mechanism 116 includes a male thread 118 for engaging complementary female threads formed on the fastening member 80 to the tool holder 100. In such embodiments, the fastening member 80 is provided with a complementary female thread suitable for engaging the tool holder's male thread 118 and is, for example, a lock nut. Thus, the tool 1 may be devoid of a bayonet coupling for securing the tool body 10 to the tool holder 100.

The central holder protrusion 122 includes a forward protrusion surface 124, a protrusion peripheral surface 128 and a central protrusion recess 136. The forward protrusion surface 124 is axially spaced apart from, and located forwardly of, the forward holder surface 120 and the protrusion peripheral surface 128 extends between the forward protrusion surface 124 and the forward holder surface 120.

The central protrusion recess 136 is recessed in the forward protrusion surface 124. The central protrusion recess 136 is devoid of threading for fastening therein. The central holder protrusion 122 is shaped in a way which does not allow rotation of the tool body 10 relative to the tool holder 100 when the cutting tool 1 is assembled, so any such threading could not be used for fastening.

In a circumferential direction about the longitudinal holder axis L, the protrusion peripheral surface 128 alternatingly increases and decreases in distance from the longitudinal holder axis L, forming a plurality of angularly spaced apart holder teeth 132. In embodiments where the cutting tool rotates about an axis, portions of the holder teeth 132 which face the direction of rotation R serve as 'driving' surfaces'. These 'driving surfaces' abut and 'drive' the 'driven surfaces' formed on the holder body's inner recess surface 38 which face opposite the direction of rotation R, when the tool body 10 is mounted on the tool holder 100 in the assembled tool 1.

The tool holder 100 may be in fluid connection with the tool body 10. Specifically, coolant may be supplied through the central protrusion recess 136 to the body coolant inlet 72. The O-ring 76 may be placed between the tool holder 100 and the tool body 10, helping seal the fluid connection therebetween. In some embodiments, the O-ring 76 occupies a circular O-ring recess 138 formed in the central protrusion recess 136 and surrounding the body coolant inlet 72

Figure 9:
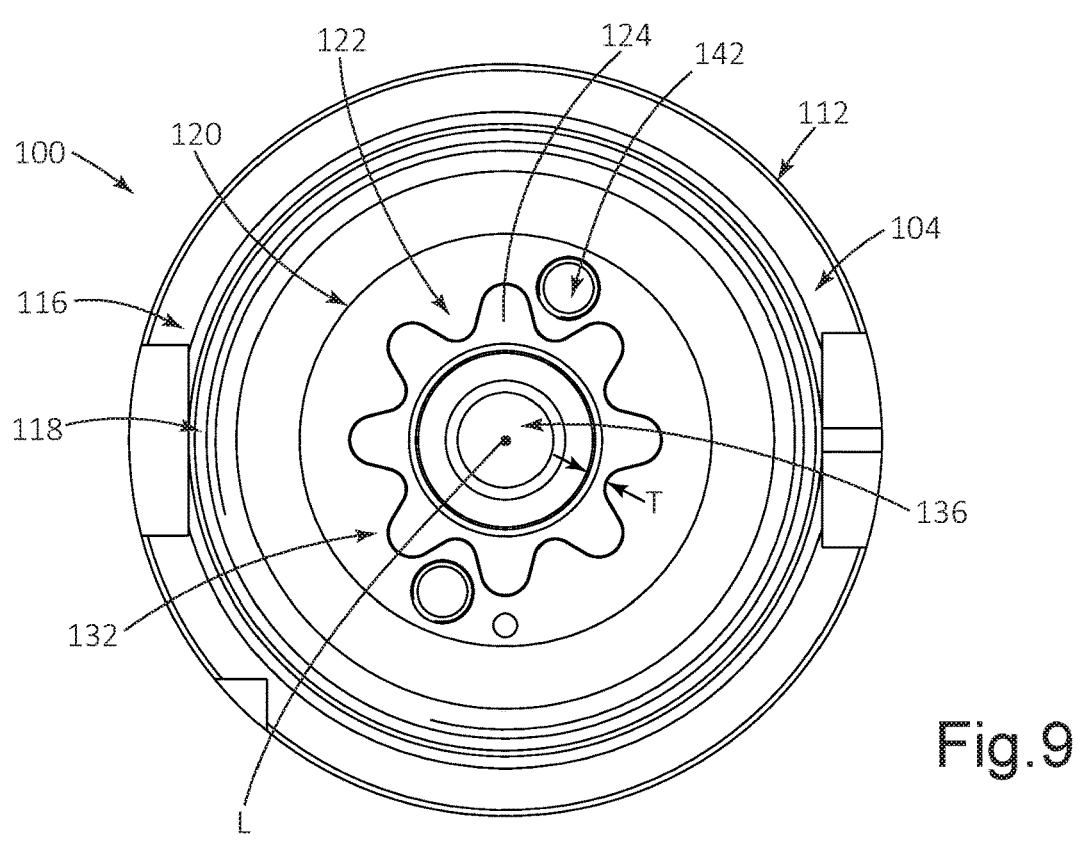
FIG. 9 is a front view of the tool holder of FIG. 8.
Figure 10:
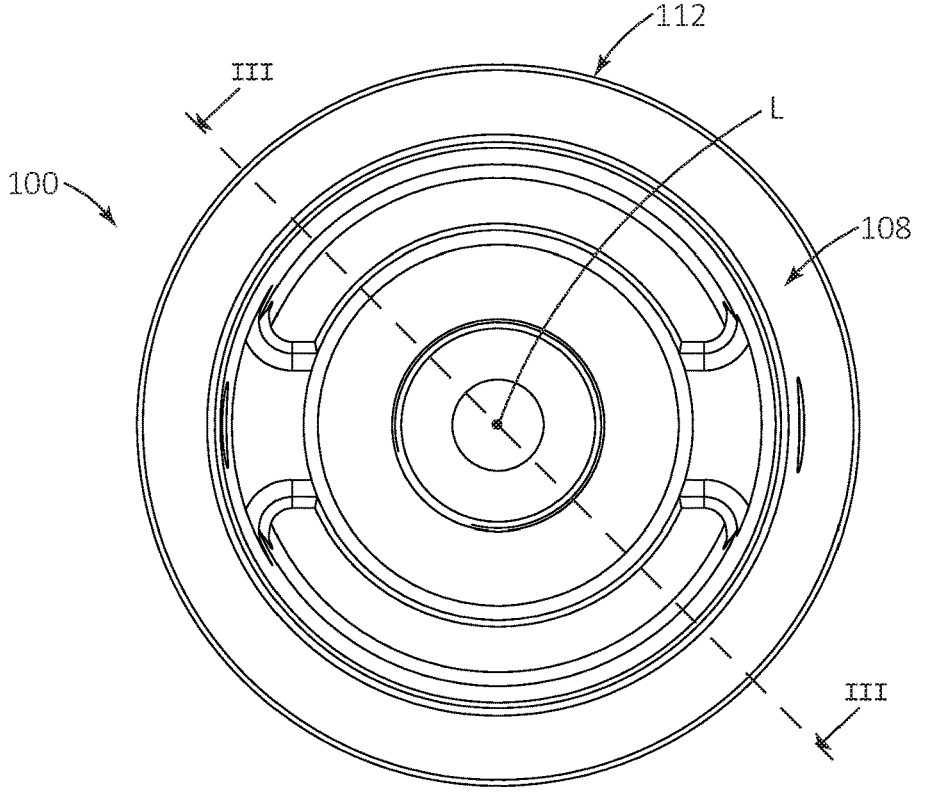
FIG. 10 is a rear view of the tool holder of FIG. 8.
Figure 11:
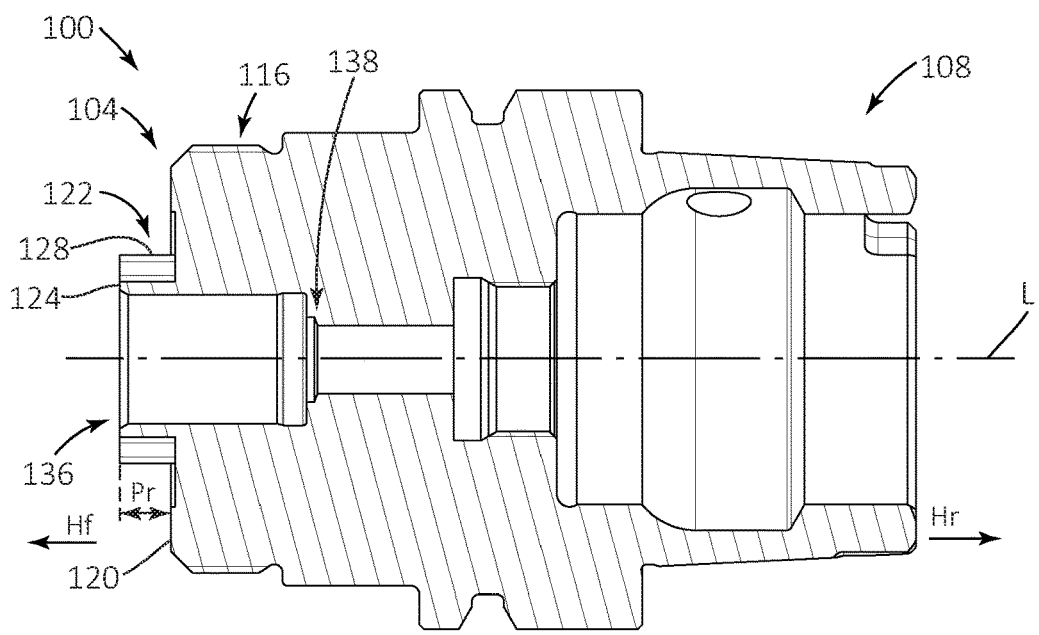
FIG. 11 is a cross section view of the tool holder of FIG. 8 along line III-III in FIG. 10.

Drawing attention to FIG. 9, a holder protrusion minimal thickness T and a protrusion length Pr are shown. The holder protrusion minimal thickness T is measured from the central body recess 136 to the protrusion peripheral surface 128. The protrusion length Pr is measured from the forward holder surface 120 to the forward protrusion surface 124.

For the central holder protrusion 122 to fit within the central body recess 36, the minimal recess width W and the holder protrusion minimal thickness T fulfil the following condition: $T \leq W$. In some embodiments, the holder protrusion minimal thickness T fulfils the following condition: $0.9 \text{ mm} \leq T \leq 2.5 \text{ mm}$.

Similarly, for the central holder protrusion 122 to fit within the central body recess, allowing the rear body surface 34 to abut the forward holder surface 120 (which allows for a stable connection therebetween), the protrusion length Pr and the recess depth Rd fulfil the following condition: $Pr \leq Rd$. In some embodiments, the protrusion length Pr fulfils the following condition: $2.9 \text{ mm} \leq Pr \leq 10 \text{ mm}$.

Figure 12:
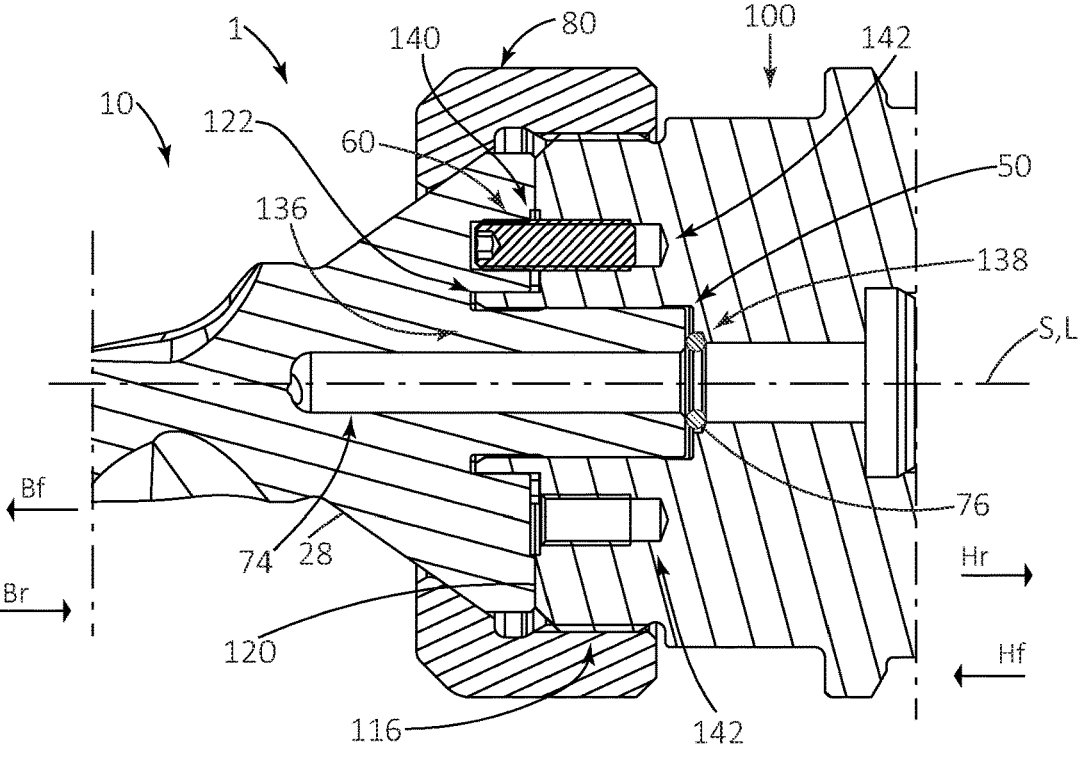
FIG. 12 is a cross section view of the cutting tool of FIG. 1 along line I-I in FIG. 1.

Drawing attention to FIG. 12, when the cutting tool is assembled, the fastening member 80 fastens the tool body 10 to the tool holder 100, the central holder protrusion 122 is accommodated in the central body recess 36 and the integral central pin 50 is accommodated within the central protrusion recess 136.

Specifically, when the fastening member 80 is a lock nut, the fastening member 80 is placed over the tool body 10, is engaged with the male thread 118 of the fastening mechanism 116 and clamps the clamping flange surface 28.

Further on assembly of the cutting tool 1, the holder teeth 132 abut against the body recess peripheral surface 42. Specifically, each longitudinal axis crest 46 is accommodated between two adjacent holder teeth 132 and each holder tooth 132 is accommodated in one of the longitudinal axis troughs 48.

It is preferred, but optional, that the inner recess surface 38 of the central body recess 36 is spaced apart from the forward protrusion surface 124. Similarly, the integral central pin 50 is, preferably but optionally, spaced apart from the central protrusion recess 136.

In some embodiments, where the tool body 10 can be fastened in multiple positions to the tool holder 100, the tool holder 100 may further include a locating pin 140 protruding from the forward holder surface 120. When fastening the tool body 10 to the tool holder 100, the locating pin 140 is accommodated in the locating pin receptacle 60 of the tool body 10, reducing the number of available positions in which the tool body 10 can be fastened to the tool holder 100. The locating pin 140 is spaced apart from the locating pin receptacle 60.

Preferably but optionally, the locating pin 140 is releasably fastened to the tool holder 100. The tool holder 100 may further include at least two pin fastening bores 142. The pin fastening bores 142 are recessed in the forward holder surface 120 with the locating pin 140 detachably attached to one of the pin fastening bores 142. Attaching the locating pin 140 to different pin fastening bores 142 results in different positions the tool body 10 can be attached to the tool holder 100. In such case, the locating pin 140 may be a screw, for example.

Although the subject matter of the present application has been described to a certain degree of particularity, it should be understood that various alterations and modifications could be made without departing from the spirit or scope of the invention as hereinafter claimed.

For example, while the drawings show eight alternating crests 46 and troughs 48 formed on the tool body's inner recess surface 38 and eight teeth 132 formed on the tool holder's protrusion peripheral surface 128, other numbers of these structures may be provided. For instance, in some embodiments, only four or only six of these structures may be provided. Other numbers of these structures are also contemplated.

What is claimed is:

1. An elongated tool body (10) having a longitudinal body axis(S) defining opposite forward and rearward body directions (Bf, Br), the tool body (10) comprising:

a body peripheral surface (22) extending about the longitudinal body axis(S);

a rearwardly disposed rear body surface (34) circumferentially bounded by the body peripheral surface (22);

a central body recess (36) recessed in the rear body surface (34), and comprising:

an inner recess surface (38) located forwardly of the rear body surface (34);

a body recess peripheral surface (42) extending between the inner recess surface (38) and the rear body surface (34); and a recess depth (Rd) measured along the longitudinal body axis(S) from the rear body surface (34) to the inner recess surface (38); and an integral central pin (50) monolithically formed with the rear body surface (34) and the central body recess (36), the integral central pin (50) comprising:

a rear pin surface (52) located rearwardly of the inner recess surface (38) and delimiting the integral central pin (50) in the rearward body direction (Br);

a peripheral pin surface (54) located between the inner recess surface (38) and the rear pin surface (52); and an integral pin length (Pi) measured along the longitudinal body axis(S) from the inner recess surface (38) to the rear pin surface (52);

wherein:

in a circumferential direction about the longitudinal body axis(S), the body recess peripheral surface (42) alternatingly increases and decreases in distance from the longitudinal body axis(S), thereby forming a plurality of angularly spaced apart longitudinal axis crests (46); and a minimal recess width (W) is measured as the minimal distance between the peripheral pin surface (54) and the plurality of longitudinal axis crests (46).

2. The tool body (10) according to claim 1, wherein:

the integral central pin 50 is cylindrical with a pin diameter Dp; and a ratio of the integral pin length Pi to the pin diameter Dp fulfills the condition $1 \leq Pi/Dp \leq 8$.

3. The tool body (10) according to claim 1, wherein:

a ratio of the integral pin length Pi to the minimal recess width W fulfills the following condition: $3 \leq Pi/W \leq 20$.

4. The tool body (10) according to claim 1, wherein:

a ratio of the recess depth Rd to the minimal recess width W fulfills the following condition: $3 \leq Rd/W \leq 5$.

5. The tool body (10) according to claim 4, wherein:

the rear body surface (34), the central body recess (36) and the integral central pin (50) comprise an additively manufactured monolithic structure.

6. The tool body (10) according to claim 1, wherein:

the longitudinal axis crests (46) are evenly spaced apart about the longitudinal body axis (S).

7. The tool body (10) according to claim 1, wherein:

the tool body (10) further comprises a locating pin receptacle (60) recessed therein.

8. The tool body (10) according to claim 1, wherein:

the body peripheral surface (22) comprises a clamping flange surface (28) sloping away from the longitudinal body axis(S) in the rearward body direction (Br).

9. The tool body (10) according to claim 1, wherein:

the recess depth Rd fulfils the following condition: 3 mm$\leq$Rd$\leq$10 mm.

10. The tool body (10) according to claim 1, wherein:

the minimal recess width W fulfils the following condition: 1 mm$\leq$W$\leq$2.5 mm.

11. The tool body (10) according to claim 1, wherein:

at least one body coolant outlet (70) is in fluid connection with, and located forwardly of, at least one body coolant inlet (72).

12. A cutting tool (1), comprising:

a tool body (10) according to claim 1;

a tool holder (100) having a longitudinal holder axis (L) defining opposite forward and rearward holder directions (Hf, Hr); and a fastening member (80) fastening the tool body (10) to the tool holder (100).

13. The cutting tool (1) according to claim 12, wherein:

the tool holder (100) has a peripheral holder surface (112) comprising a male thread (118); and the fastening member (80) comprises a lock nut having a female thread engaged to the male thread (118) of the peripheral holder surface (112).

14. The cutting tool (1) according to claim 12, wherein the tool holder (100) comprises:

a peripheral holder surface (112) extending about the longitudinal holder axis (L);

a fastening mechanism (116) located about the longitudinal holder axis (L) on the peripheral holder surface (112);

a forwardly disposed forward holder surface (120) facing in the forward direction (Hf); and a central holder protrusion (122) protruding forwardly from the forward holder surface (120), the central holder protrusion (122) comprising:

a forward protrusion surface (124), axially spaced apart from, and located forwardly of, the forward holder surface (120);

a protrusion peripheral surface (128) extending about the longitudinal holder axis (L), between the forward protrusion surface (124) and the forward holder surface (120); and a central protrusion recess (136) recessed in the forward protrusion surface (124);

wherein:

in a circumferential direction about the longitudinal holder axis (L), the protrusion peripheral surface (128) alternatingly increases and decreases in distance from the longitudinal holder axis (L), thereby forming a plurality of angularly spaced apart holder teeth (132).

15. The cutting tool (1) according to claim 14, wherein:

the central holder protrusion (122) of the tool holder (100) is accommodated in the central body recess (36) of the tool body (10);

the plurality of holder teeth (132) abut against the body recess peripheral surface (42);

the inner recess surface (38) is spaced apart from the forward protrusion surface (124); and the integral central pin (50) is accommodated within, and spaced apart from, the central protrusion recess (136).

16. The cutting tool (1) according to claim 15, wherein:

the tool body (10) further comprises a locating pin receptacle (60) recessed therein;

the tool holder (100) further comprises a locating pin (140) protruding therefrom; and the locating pin (140) is accommodated within, and spaced apart from, the locating pin receptacle (60).

\* \* \* \* \*